C. ESPING.
WHEELED PLOW.
APPLICATION FILED AUG. 15, 1916.
1,302,339.
Patented Apr. 29, 1919.
3 SHEETS—SHEET 1.
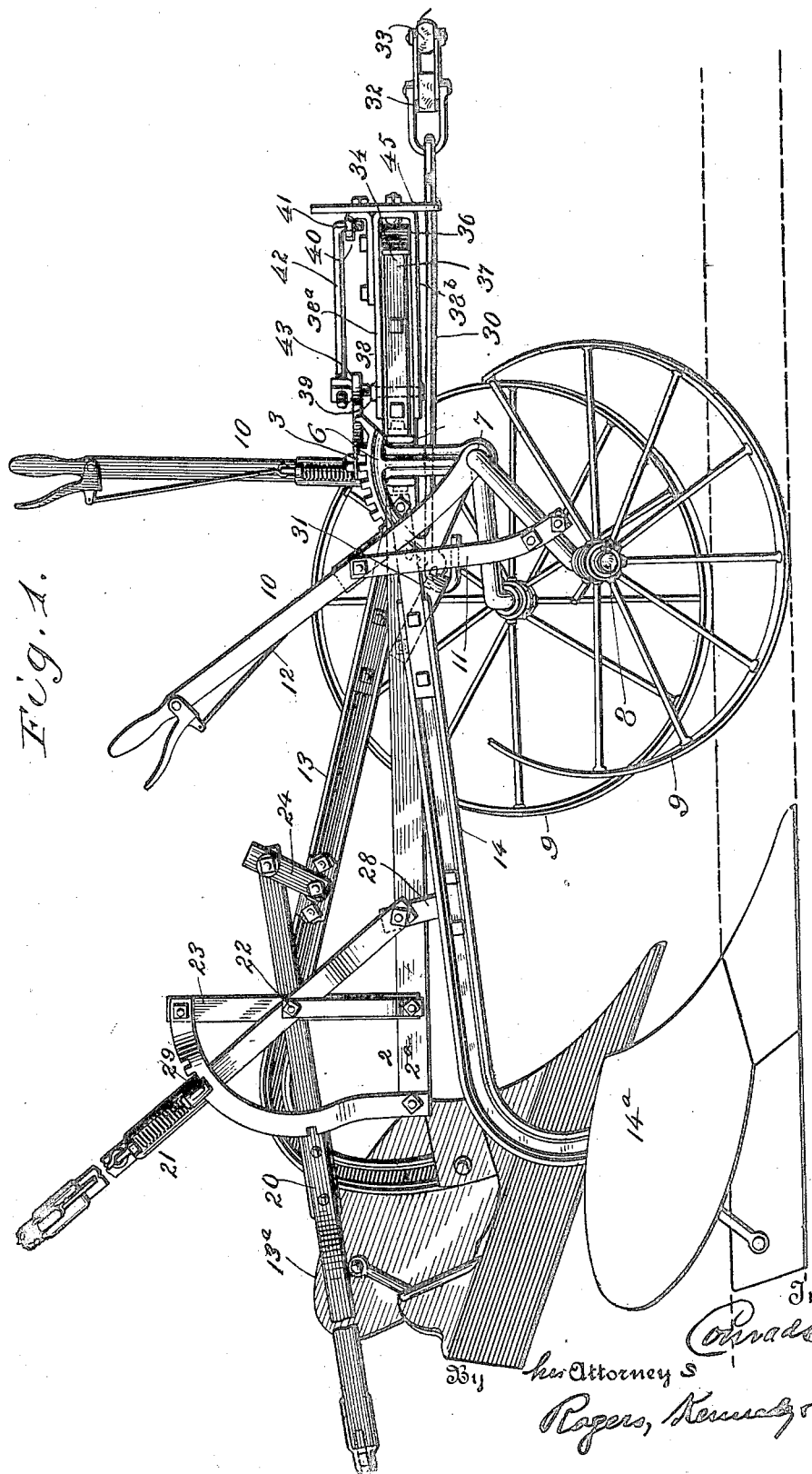

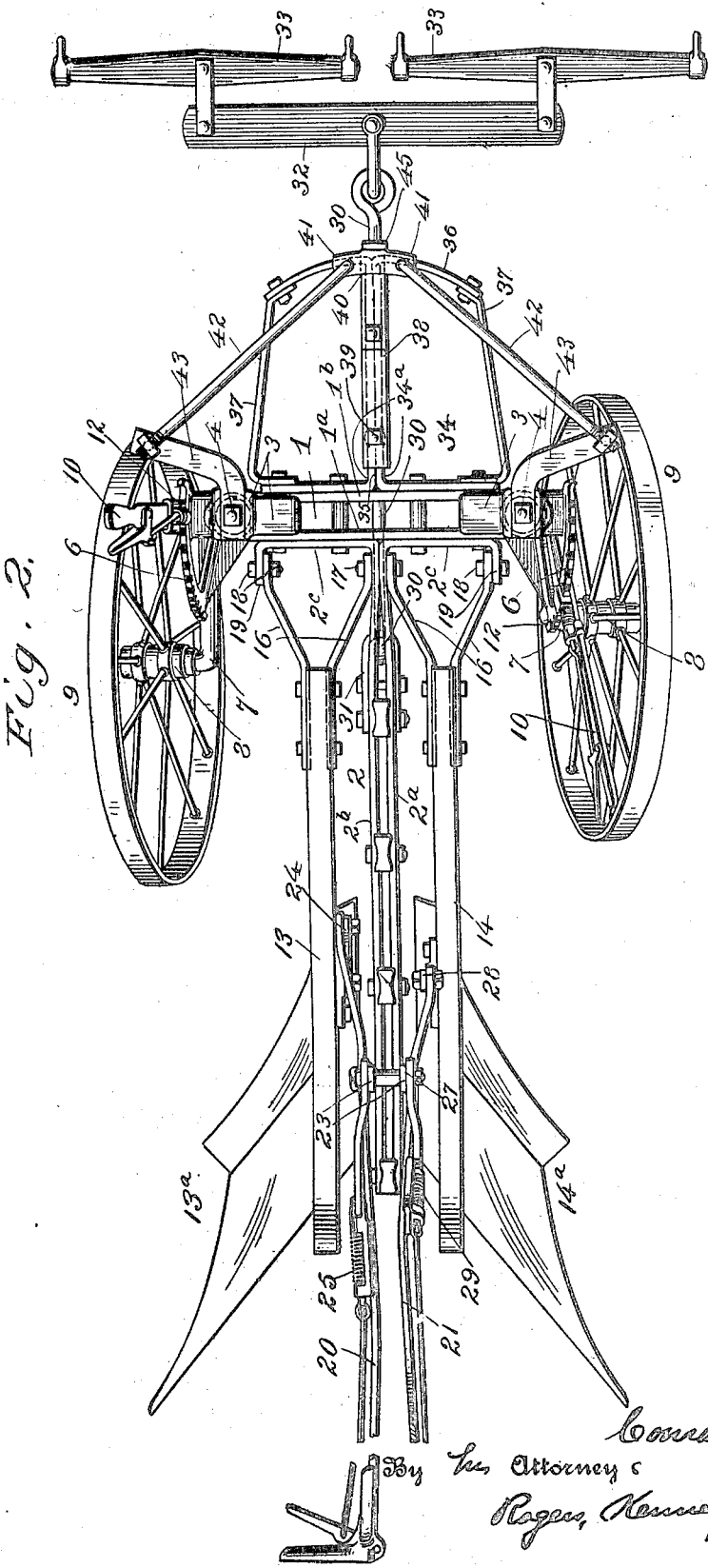

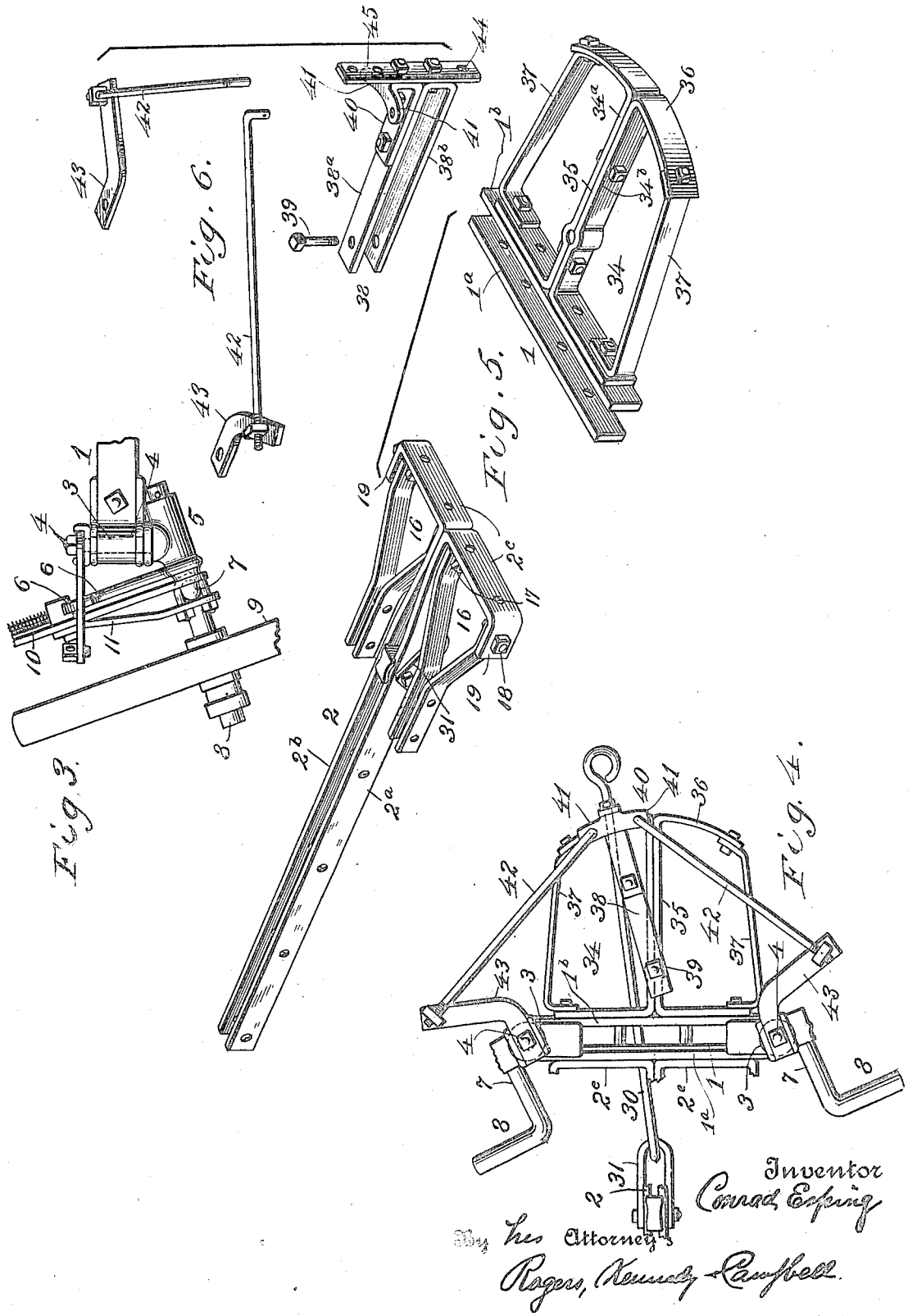

UNITED STATES PATENT OFFICE.

CONRAD ESPING, OF MOLINE, ILLINOIS, ASSIGNOR TO MOLINE PLOW COMPANY, A CORPORATION OF ILLINOIS.

WHEELED PLOW.

1,302,339.    Specification of Letters Patent.    Patented Apr. 29, 1919.

Application filed August 15, 1916. Serial No. 114,954.

*To all whom it may concern:*

Be it known that I, CONRAD ESPING, a citizen of the United States, residing at Moline, in the county of Rock Island and State of Illinois, have invented certain new and useful Improvements in Wheeled Plows, of which the following is a specification, reference being had therein to the accompanying drawing.

This invention relates to wheeled plows of the type known as "two-way" plows, in which two plows pointing in the same direction but facing in opposite directions and movable up and down out of and into action alternately, are associated with front carrying wheels movable up and down with the plows, so that when one plow is down in action its associated wheel will be in lowered position and will travel in the furrow as a furrow wheel, while the wheel associated with the other plow elevated out of action, will be in raised position to travel on the land as a land wheel. Such machine traveling alternately back and forth through the field will, when the two plows are alternately reversed in position for the successive furrows, throw all the furrows in the same direction.

Plows of this type are especially useful in small fields where the first furrow can be turned against the fence or dividing line and the return furrow thrown into the first and the operation repeated until the field is completely plowed. In plowing a field in this manner, the machine in turning at the ends of the furrows should operate as close as possible to the dividing line or fence in order to leave the smallest extent possible of unplowed ground.

My invention is designed mainly to meet this requirement, and the invention consists of a two-way plow embodying various improved features of construction having in view compactness and simplicity in the general arrangement of the parts, ease and facility in the adjustment of the beams and wheels at the ends of the furrows or in transportation, and facility for effectively guiding the machine by the draft team and turning short at the ends of the furrows.

In the accompanying drawings:

Figure 1 is a side elevation of a two-way plow having my invention embodied therein, the near plow and its associated wheel being lowered in action with the wheel traveling in the furrow, and the other plow raised out of action with its wheel traveling on the land.

Fig. 2 is a top plan view of the same.

Fig. 3 is front elevation of one of the carrying wheels showing how it is swiveled in the frame.

Fig. 4 is a plan view of the front portion of the machine showing how the plow is turned and guided by the draft team.

Fig. 5 is a perspective view of certain portions of the machine frame separated from each other.

Fig. 6 is a perspective view of certain details of the plow guiding means.

Referring to the drawings:

The frame of the machine comprises generally a front transverse frame member 1 comprising two horizontal spaced frame bars $1^a$ and $1^b$ connected together in the form of a unitary structure, and a central rearwardly extending frame member 2 consisting of two spaced bars $2^a$ and $2^b$ extending side by side longitudinally and connected together in fixed relations and having their forward ends extending outwardly in opposite directions as at $2^c$ and firmly connected to the rear side of the transverse frame member 1, the said transverse frame member and the longitudinal frame member $2^a$ thus constituting in effect a single, rigid, unitary frame structure.

The transverse frame member 1 gives support at its opposite ends to blocks or castings 3 provided with vertical bearing openings in which are mounted vertical journals 4 extending upwardly from horizontal sleeves 5 carrying at their outer ends upright segment frames 6, the arrangement being such that these segment frames may swivel or turn in the bearing openings in the block about the axis of the journals. Crank axles 7 have their inner ends mounted to rock in horizontal bearing openings in the sleeves, and are formed on their outer ends with horizontal wheel journals 8 on which the carrying wheels 9 are respectively mounted, the bearing openings in the sleeves 5 being inclined downwardly in order to give the wheels a stagger or set, to act as furrow wheels. These wheels are adapted to be adjusted in a vertical direction independently of each other by means of hand levers 10 loosely supported at their lower ends on the inner portions of the crank axles adjacent the sleeves, and connected by means of links 11 with the crank portions of the axles, the said levers being provided with locking latches 12 to coöperate with the segment frames 6. As a result of this construction the wheels are adapted to be moved up and down independently of each other by the hand levers to act respectively as furrow wheels and land wheels, and to be held in different positions of adjustment. The wheels are adapted also to swivel about the vertical axes of the journals 4 in the guiding movements of the machine at the ends of the furrows, such swiveling movements being controlled by the draft team in the manner to be more particularly described hereinafter.

Arranged in rear of the transverse portion 1 of the frame are two plow beams 13 and 14 which extend side by side at the opposite sides of the longitudinal frame member 2 and in close proximity to the same, the beam 13 being provided with a moldboard plow 13$^a$ arranged to throw the furrow to the left, and the beam 14 being provided with a moldboard plow 14$^a$ arranged to throw the furrow to the right, both plows however pointing forwardly in the same direction as customary in certain types of two-way plows. The beams are pivoted at their forward ends to the transverse frame member 1 about coincident horizontal axes so that they may be swung up and down respectively out of and into action, each beam being provided at its forward end for this purpose with a pair of diverging arms 16, the inner arms of the pairs being pivoted to the longitudinal frame member by means of a horizontal pivot bolt 17, and the outer arms being pivoted by means of horizontal pivot bolts 18, respectively to rearwardly extending ears 19 on the laterally extending portions 2$^c$ of the frame bars 2$^a$ and 2$^b$ before alluded to, the said pivot bolts 17 and 18 being in horizontal alinement with each other to cause the axes of the two beams to be coincident with each other.

The up and down swinging movements of the beams are controlled independently by means of two hand levers, a hand lever 20 for the beam 13, and a hand lever 21 for the beam 14. The hand lever 20 is pivoted between its ends on a horizontal pivot bolt 22 extending through an upright segment frame 23 fixed to and extending upwardly from one side of the longitudinal frame member 2 at its rear end, the forward end of the said lever being jointed to the beam 13 by means of a short link 24 pivoted at one end to the beam and at its other end to the lever, and the lever being provided with a locking latch 25 adapted to engage notches in the segment frame. The hand lever 21 is pivoted between its ends on the said pivot bolt 22 to a segment frame 27 fixed to the central frame member alongside the other segment frame, the forward end of the lever being jointed to its beam by a link 28, and the lever being provided with a locking latch 29 to engage the teeth on its segment frame. The two levers thus mounted and connected with their respective beams are independently operable to raise and lower the beams independently of each other, upper and lower notches being provided in the segment frames for locking the beams respectively down in action or out of action as shown in Fig. 1.

In the operation of the machine so far described, when the machine is traveling for instance to the right as shown in Fig. 1, the right hand plow is lowered into action and its associated furrow wheel is likewise lowered, these adjustments being effected independently by the manipulation of the hand levers 21 and 10 respectively. When the furrow is completed and the machine is turned to travel in the reverse direction, the plow and its associated wheel just in action are raised out of action and the other plow and its wheel lowered, the former wheel now acting as a land wheel and the other as a furrow wheel.

The draft is applied to the machine by means of a fore and aft extending draft rod 30 having its rear end engaged with a draft strap 31 connected with the central frame member 2 adjacent its forward end. At its front end the rod is adapted to have connected with it a double tree 32 carrying the usual swingletrees 33 to which the draft animals are hitched. The connection of the rear end of the draft rod with the strap is such that said rod will be swung to the right and left about a vertical axis as the draft team turns in the corresponding directions, and in order that the carrying wheels may be likewise turned by the team to guide the machine, I provide suitable connecting means of novel form between the draft rod and carrying wheels, which will operate to turn the carrying wheels automatically about the vertical axes of the journals 4 as the draft rod is shifted horizontally by the team.

To effect this action of the parts a horizontal frame 34 is fixed to and extends forwardly from the transverse frame member 1. This frame 34 is formed by means of two plates 34$^a$ extending in a fore and aft direction and firmly connected to each other so as to form a rigid central supporting member 35. At their rear ends these plates are extended outwardly in opposite directions and are firmly bolted or otherwise secured to the front frame member 1$^b$ of the transverse frame 1. At their forward ends the plates 34$^a$ are curved outwardly in opposite directions so as to constitute a segmental or arcuate supporting member 36 on the front of the frame 34, the outwardly extending front and rear ends of the bars being firmly connected together by means of fore and aft extending brace straps 37 all as shown more particularly in Figs. 2 and 5. Supported on the front curved member 36 of the frame 34 is a swinging member 38 which consists of a U-shaped frame with upper and lower arms $38^a$ and $38^b$. The frame 34 is embraced between these arms, which latter are pivoted to the fixed central supporting member 35 by means of a vertical pivot bolt 39 extending through the rear ends of the arms and through said supporting member. As a result of this construction the U-shaped frame 38 may be swung horizontally about the axis of the pivot bolt 39 and in such movements will be supported by the forward curved guiding portion 36 of the frame 34. A bracket 40 is fixed to the upper arm $38^a$ of the frame 38 at its forward end, which bracket is provided with oppositely extending arms 41. These arms have jointed to them the forward ends of links 42 which extend rearwardly and outwardly and have their rear ends jointed to the outer ends of arms 43 which latter arms extend inwardly and are fixedly connected with the upper ends of the respective journals 4. As a result of this construction and arrangement of the parts the lateral swinging movements of the U-shaped frame 38 will turn the arms 43 in the same direction, which action will turn the journals 4 in their bearings in the machine frame and will correspondingly swing the carrying wheels 9.

The draft rod 30 before alluded to extends at its forward end through a horizontal opening 44 in a vertical plate 45 fixed to the forward end of the U-shaped frame 38 so that the horizontal swinging movements of the draft rod as the team turns in either direction, will be transmitted to the swinging U-shaped frame, and these movements will in turn be transmitted to the carrying wheels, causing them to swivel the same and guide the machine.

This guiding action of the parts is shown more particularly in Fig. 3 where it will be seen that the draft team has turned to the left and has correspondingly swung the draft rod in like direction, which action has in like manner, swung the U-shaped frame 38 and through the medium of the links 42 and arms 43, the two carrying wheels have been turned in the same direction relatively to the machine frame. When the team turns in the opposite direction to guide the machine to the right, the foregoing actions are repeated but in the reverse direction. It is seen therefore that by the turning of the draft team to the right or left, both carrying wheels are simultaneously turned to guide the machine in corresponding direction thereby effecting a prompt and short turn of the machine and enabling the same to plow at the ends of the furrows close up to the dividing line or fence.

By arranging the beams on the opposite sides of the central longitudinal frame member the beams are disposed in close and compact arrangement, thereby reducing the width of the machine in a transverse direction to a minimum, and adapting the same for work close up to the fences or lines which divide the fields. The controlling levers for the beams by being supported on the central frame member between the beams, are brought in close relations to each other where they may be conveniently operated by the driver in raising and lowering the beams for alternate action, or in raising the same for transportation.

In the foregoing description and accompanying drawings I have set forth my invention in the particular detailed form which I prefer to adopt and which in practice has been found to answer to a satisfactory degree the ends to be attained. It will be manifest, however, that these details may be variously changed and modified without departing from the limits of my invention, and further it will be understood that the invention is not limited to any particular form or construction of the parts except in so far as such limitations are specified in the claim.

Having thus described my invention, what I claim is:

In a plow, the combination of a frame comprising a transverse portion and a longitudinal frame member extending rearwardly therefrom, carrying wheels mounted on the transverse portion of the frame, plow beams extending longitudinally one at each side of the longitudinal frame member and connected with said transverse portion of the frame, and a draft rod coupled with the longitudinal frame member in rear of said transverse portion and adapted for the attachment of the draft team.

In testimony whereof, I have affixed my signature.

CONRAD ESPING.